Patented May 29, 1951

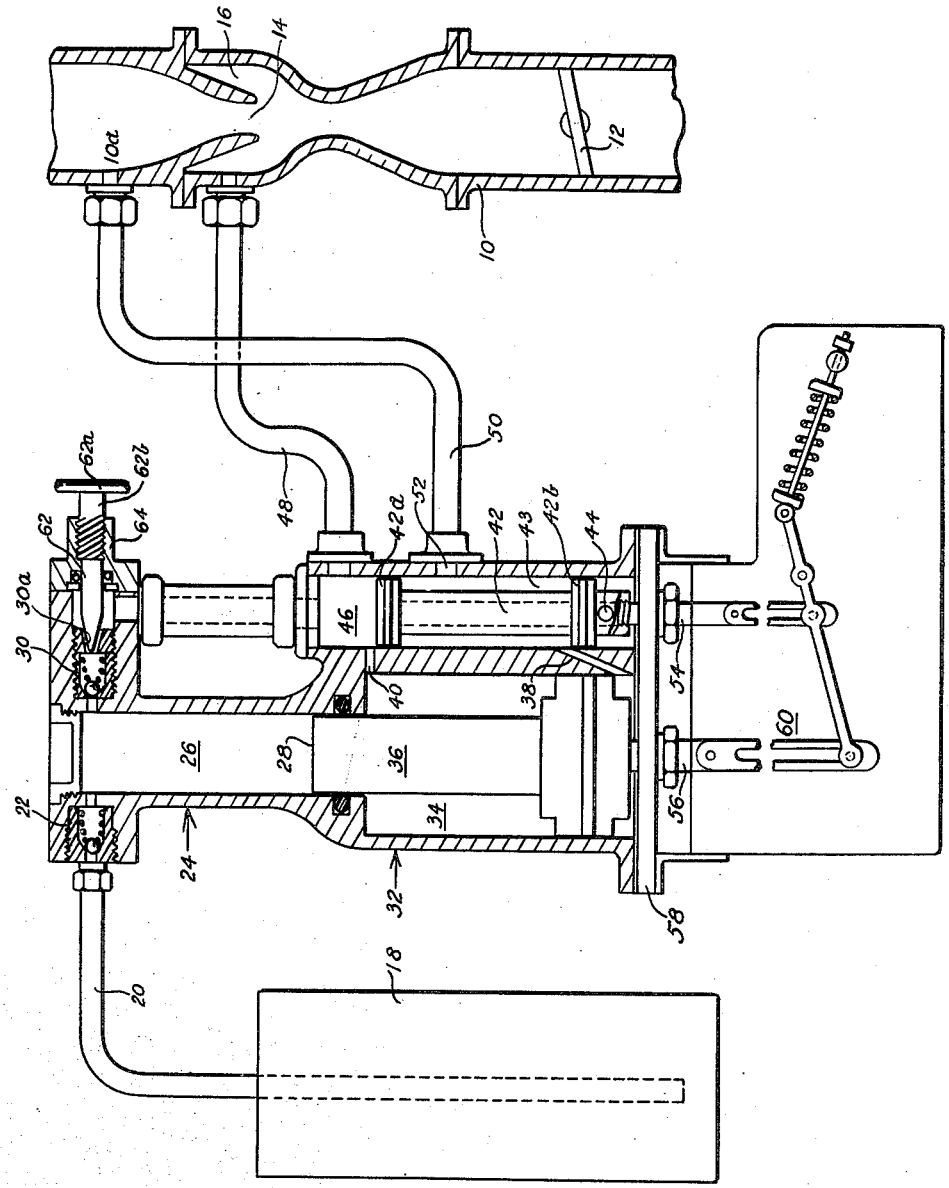

2,554,772

UNITED STATES PATENT OFFICE 2,554,772

WATER CONDITIONER

Clifford H. Bereman, Los Angeles, Calif.

Application December 20, 1948, Serial No. 66,322

7 Claims. (Cl. 210—31)

My invention relates broadly to a method of, and means for, the feed of a solution into a confined stream of fluid, which stream may be constant or of varying flow volume, and the feed of the solution into the stream being automatically proportioned to the volume of flow conditions existing at any time in the stream.

The invention specifically relates to the admixture of a solution of sodium hexametaphosphate to domestic water systems to "soften" the water, but obviously is not limited to such use; the accurate addition of solutions in a predetermined ratio to fluids being required in a large number of industrial and other applications. Various types of apparatus for the addition of a softening, or other medium, to water or other fluids in a predetermined ratio value have been proposed or are in use, but to the best of my belief such equipment is not capable of substantially perfect accuracy under all conditions, and is subject to various shortcomings and disadvantages, such as high cost, large amount of space taken by the equipment, required skilled supervision, lack of constant performance over long periods of time, lack of ability by the average user to readily determine the relative ratio of the softening agent to the volume of the water stream and the like.

An object of my invention is to provide a novel method of, and means for, adding a solution in a predetermined ratio to a stream of liquid and which ratio is automatically maintained at all times and under any conditions of flow of the liquid stream.

Another object of my invention is to provide a novel method that is effective to set up a localized zone in a stream of liquid of different pressures, the difference in pressure varying with the square of the rate of flow of the stream, and also utilize the pressure differential in the liquid stream to positively pump the solution, through control means effective to vary the flow of solution as the square root of its rate of flow, so that the solution is added in a constant ratio to the stream of liquid irrespective of variations in the rate of flow of the liquid stream.

A further object of my invention is to provide novel apparatus to carry out the method of my invention, which may be rapidly and accurately adjusted to deliver a predetermined ratio of solution to a stream of liquid, and which may thereafter be checked and adjusted, if necessary, with equal ease and rapidity.

Other objects, advantages and features of invention may appear from the accompanying drawing, the subjoined detail description, and the appended claims.

The accompanying drawing illustrates the invention in a form I at present deem preferable.

In the drawing, the figure illustrates a form of my invention which incorporates the novel features thereof and which is shown partly in section and partly in side elevational view thereof.

The numeral 10 indicates the cold water feed pipe to a usual water heater (not shown). The flow of water into the heater may be controlled by the usual automatic means responsive to the amount of water drawn off from the heater through the hot water faucets of a house or factory, for instance; but to facilitate explanation of the invention, a balanced valve 12 is shown for controlling the flow of water through pipe 10, the valve being arranged between the connection of the device of my invention to the cold water feed pipe and the hot water tank.

A constriction 14 is arranged in pipe 10 to provide a path through which the fluid flows at a higher speed and surrounding the constriction a low pressure area 16 is provided. The constriction as shown in the drawing is of a Venturi like arrangement in order to insure steady flow of fluid through the pipe. It will be evident that a true Venturi nozzle might be utilized, if preferred, to provide an area of higher pressure (at lower velocity of flow) ahead of the venturi and an area of lower pressure (at higher velocity) at the throat of the venturi.

Connections are provided between the areas at higher and lower pressures in the pipe and the mixing device and will be explained after the following description of said device.

A tank 18 containing a solution of a suitable chemical and water in predetermined proportions is connected by pipe 20 to the intake valve port 22 of a pump generally indicated at 24. The pump comprises a cylinder 26, plunger 28, and outlet valve 30. The piston is reciprocated through an unvarying distance in synchronism with a water motor, generally indicated at 32, operated by liquid flowing from the high pressure area 10a of the pipe 10, and exhausting into the low pressure area 16 of the pipe. Since the pump will be operated at a rate dependent on the ratio of the high and low pressure areas which again is dependent on the rate of flow of water through the pipe and a constant volume of chemical fluid is additively discharged at each stroke of the synchronously driven pump, the amount of water softening material added to the water flowing through the pipe 10 is held constant regardless of variations of flow of liquid through pipe 10, as will be more fully hereinafter explained.

The water motor 32 comprises a cylinder 34, preferably of larger diameter than, and co-axial with, pump cylinder 26, and a free piston 36 reciprocable in the cylinder and preferably integral with pump plunger 28.

Ports 38, 40 serve alternately as inlet and exhaust ports. The ports are controlled by a piston valve 42 mounted in a cylinder 43, comprising a tubular body carrying spaced heads 42a, 42b controlling ports 38 and 40, respectively, and having a hole 44 drilled through the wall of the piston 42 between head 42b and the adjacent end of the piston valve and communicating with the bore through the piston, which bore at its upper end opens into the discharge manifold 46. A discharge pipe 48 is connected between discharge manifold 46 and the low pressure area 16 of pipe 10.

An inlet pipe 50 is connected between the high pressure area ahead of the constricted portion 14 of the pipe and an inlet port 52 for fluid under pressure opens into the piston valve cylinder 43 between heads 42a and 42b of the piston.

The piston valve is fitted with an operating rod 54 and the piston of the water motor is fitted with an operating rod 56, both rods passing through a head 58 through the usual hydraulic packing glands into a housing 60. Any suitable arrangement of linkage (not shown) connecting stems 54 and 56 is positioned in housing 60 and is operative to move piston valve 42 with a snap action at the end of each stroke of piston 36, so that the port serving as an inlet for pressure fluid will be cut off from the pressure supply and put in communication with the exhaust manifold, while the port serving as an exhaust for fluid from the cylinder will be cut off from the exhaust manifold and put in communication with the pressure fluid, thus the effective pressure at all times acts on piston 36 and plunger 28 which sets up a greater pressure in pump cylinder 26 which will be inversely proportional to the diameters of the motor and pump cylinder.

The exhaust port 30 of the pump communicates with the exhaust manifold 46 through an orifice 30a under the control of an adjustable valve 62, the provision of this adjustable orifice being an important feature of my invention.

As shown in the drawing, valve 62 may be formed as a needle valve having a thumb wheel 62a mounted on the stem 62b thereof and arranged in a position outside the casing of the device for ready access. The stem 62b is provided with a screw thread engaging with a threaded bore in a block 64 bolted to the wall of the device axially of the outlet port of the pump, and having a tapered head engaging with the outwardly flared wall of orifice 30a. The shape of the orifice and valve head are carefully formed to secure the correct relation for all positions of the valve for the flow of fluid through a submerged orifice of $Q=Ca v\sqrt{2gH}$ where $Q$ is the quantity of fluid flowing in unit time, $Ca$ is a constant usually taken as .62, $g$ is the acceleration due to gravity, and $H$ is the pressure acting on the water, calculated as its equivalent in head. Since the flow of a fluid depends on its head neglecting frictional losses the term $2gH$ stands for speed of flow.

It will be noted that no use is made of air chambers in my apparatus, thereby preventing inaccuracy in functioning due to the compressibility of air and changes in its volume due to changes in temperature.

*Operation.*—I intend the term solid liquid flow line to indicate a system not having any air vessels or other yieldable cushioning means which might affect the pressures utilized in my invention.

A brief general discussion of the principles of my novel method and device for mixing fluids is given in order that the novel features thereof may be clearly understood.

The difference of the pressure in the pipe 10 ahead of the restriction therein and at the point of maximum velocity, that is between the point of pressure fluid take-off for the motor and return of exhaust fluid and additive fluid, will at all times closely correspond to the square of the rate of flow of liquid through pipe 10, the difference in pressure constituting the effective pressure operating the motor. The effective pressure is at all times effective on the piston and plunger while water is flowing in pipe 10, consequently the volume of liquid delivered by the pump, neglecting friction and leakage losses, would also be proportional to the square of the rate of flow through pipe 10, whereas the volume must be in direct proportion to the rate of flow. The required correction is provided by the control exercised on the pump delivery by orifice 30a through which the fluid flow varies as the square root of the pressure difference between the pump cylinder and exhaust manifold sides of the orifice, the net result being that the flow of additive fluid sucked from tank 18 into the pump on its suction stroke and delivered to pipe 10 on its working stroke, is in direct proportion to the flow of fluid through pipe 10. The described result is ensured by the use of a common piston in the described embodiment of the invention whereby the displacement of the plunger in the pump cylinder and the piston in the motor cylinder are necessarily synchronous, as are variations in pressure ratio effective in the motor cylinder and pump cylinder. Preferably, the effective area of the pump plunger is less than that of the piston, so that the device is more sensitive in response to variations in pressure differential. The additive fluid is introduced at a higher pressure into the pipe 10 but the volume is so small that there is no appreciable disturbance of the pressure differential utilized.

The chemical sodium hexametaphosphate has the property of dissolving in water at a constant rate and in the concentrations used for water softening remains in solution without any need for stirring or agitation; however, provision must be made to vary the ratio of injection to suit conditions and to check this ratio. It is very desirable that checking of the ratio may be effected without resorting to chemical analysis and my invention provides for a simple means for accurately determining the ratio and for calibrating the apparatus from time to time by adjustment of the orifice 30a as will be evident from the example given below.

It will be assumed that the device is installed at the cold water intake of a domestic hot water heater, the cold water feed pipe being ¾ inch in diameter and the static pressure of the system being 100 lbs. per sq. in., and that it is desired to admix 5 cc. of water softening solution per gallon of water flowing into the heater, this being a representative mixture.

It is further assumed that the pump displacement is 10 cc. per stroke.

One of the faucets of the hot water system is first opened and adjusted so that it fills a five-gallon can in one minute. The orifice 30a is then adjusted so that the pump makes five strokes in two minutes, as may be determined from observing movement of the stem 56. The ratio of mixture will then be $$\frac{5 \times 10}{2}$$

or 25 cc. to 5 gallons or 5 cc. to 1 gallon of water flowing into the heater.

Calibration can be readily effected by checking the operation of the device when the flow is brought to five gallons in one minute, any correction necessary being effected by operating thumb wheel 62a. It is to be understood that the coupled reciprocating water motor and single acting pump has been chosen for illustration of the invention because of its simplicity, but it is to be understood that the principle of the invention may be incorporated in a wide variety of mechanisms without departing from the scope of the invention.

I claim:

1. A device for automatically feeding a solution into a stream of fluid in a predetermined ratio of solution to fluid, comprising a conduit guiding the stream of fluid; a constriction in said conduit setting up a high pressure area in the conduit and a lower pressure area; driving means of constant length of stroke operated directly by the differential pressure at said areas of the conduit; pump means driven by said driving means and in exact synchronism therewith as to length of stroke and number of strokes; a vessel containing solution to be fed into the stream of fluid; an inlet valve admitting solution from said vessel to the pump and an outlet orifice through which solution is discharged from said pump into the stream of fluid; a valve member effective to adjust the area of said orifice; and valve means automatically actuated by the driving means to lead fluid to flow directly between said areas at higher and lower pressures and the driving means.

2. A device for automatically feeding a solution into a stream of fluid in a predetermined ratio of solution to liquid, comprising a conduit guiding a stream of fluid under pressure, a length of said conduit being made smaller in cross section than that of the remainder of the conduit and an area larger in cross section than said portion of smaller cross section adjacent to and the pressure in which is affected by the flow of fluid through said portion of smaller cross section, a higher pressure area resulting upstream of said length of conduit of smaller cross section and an area of lower pressure resulting in the area of the conduit of larger cross section; driving means of constant length of stroke adapted to be directly operated by the differential pressure at said areas; pump means driven by said driving means and in exact synchronism therewith as to length of stroke and number of strokes; a vessel containing solution to be fed into the stream of fluid; an inlet valve admitting solution from said vessel to the pump and an outlet orifice through which solution is discharged from said pump into the stream of fluid; and a valve member effective to adjust the area of said orifice; and valve means automatically actuated by the driving means to lead fluid to flow directly between said areas at higher and lower pressures and the driving means.

3. A device for automatically feeding a solution into a stream of fluid in a predetermined ratio of solution to liquid, comprising a conduit guiding a stream of fluid under pressure, a length of said conduit being made smaller in cross section than that of the remainder of the conduit and an area larger in cross section than said portion of smaller cross section, adjacent to and the pressure in which is affected by the flow of fluid through said portion of smaller cross section, a higher pressure area resulting upstream of said length of conduit of smaller cross section and an area of lower pressure resulting in the area of the conduit of larger cross section; driving means having a cylinder, of which one end is operated as a power cylinder and the opposite end is operated as a pump, a piston common to both the power and pump ends of the cylinder said piston having an invariable length of stroke; a pipe leading working fluid from said higher pressure area of the conduit into said cylinder and a pipe leading exhaust fluid from said cylinder into said conduit at the low pressure area therein; valve means automatically operated by the movement of the piston to control the flow of working fluid into and out of said cylinder to thereby operate said piston by fluid flowing directly to the cylinder through the valve means; a vessel containing solution to be fed into the sttream of fluid; an inlet valve admitting solution from said vessel to the pump and an outlet orifice through which solution is discharged from said pump into the stream of fluid; and a valve member effective to adjust the area of said orifice.

4. A device for automatically feeding a solution into a stream of fluid in a predetermined ratio of solution to fluid, comprising a device for automatically feeding a solution to liquid, comprising a conduit guiding a stream of fluid under pressure, a length of said conduit being made smaller in cross section than that of the remainder of the conduit and an area larger in cross section than said portion of smaller cross section, adjacent to and the pressure in which is affected by the flow of fluid through said portion of smaller cross section, a higher pressure area resulting upstream of said length of conduit of smaller cross section and an area of lower pressure resulting in the area of the conduit of larger cross section; a pair of coaxial cylinders, one of said cylinders constituting a power cylinder and the other cylinder constituting a pump cylinder and being of smaller diameter than the power cylinder and having a stroke of invariable length; a piston common to both cylinders; a pipe leading working fluid from said higher pressure area of the conduit into said cylinder and a pipe leading exhaust fluid from said cylinder into said conduit at the low pressure area therein; valve means automatically operated by the movement of the piston to control the flow of working fluid into and out of said cylinder at the end of each stroke in each direction; a vessel containing solution to be fed into the stream of fluid; an inlet valve admitting solution from said vessel to the pump and an outlet orifice through which solution is discharged from said pump into the stream of fluid; and a valve member effective to adjust the area of said orifice.

5. A device for automatically feeding a solution into a stream of fluid in a predetermined ratio of solution to fluid, comprising a conduit guiding the stream of fluid; means setting up areas of higher and lower pressure in the conduit; a double ended power cylinder; a pump cylinder mounted coaxially with said power cylinder; a double acting power piston mounted in said power cylinder and extending into the pump cylinder to operate as the plunger thereof; a control valve; pipes connecting the high and low pressure areas in the conduit with the control valve; linkage arranged between said power piston and control valve effective to keep the piston in continuous reciprocating motion during flow of fluid through the conduit by fluid flowing directly between said high and low pressure areas of the conduit and the cylinder through the control valve; a vessel containing a solution to be added to the fluid in a predetermined ratio regardless of the rate of flow of said fluid; an inlet valve for the pump; a pipe conecting the fluid in said vessel with the pump inlet valve; a pump oultlet valve; a pipe connecting the pump outlet valve with the low pressure area in the conduit; and means controlling the pump discharge through the outlet valve so that variations in the rate of work of said power piston other than in direct proportion to the rate of flow of the fluid in the conduit are compensated by the means controlling the pump discharge to effect addition of solution to the fluid in the conduit in direct proportion to the rate of flow of said fluid.

6. A device as set forth in claim 5, in which the outlet valve of the pump includes an orifice and means for adjusting the cross section of said orifice.

7. A device as set forth in claim 5 in which the outlet valve of the pump includues an orifice and a needle valve mounted to vary the opening of said orifice; and operating means for said needle valve having a stem extending into a position for ready manual adjustment thereof.

CLIFFORD H. BEREMAN.

REFERENCES CITED

The following references are of record in the file of this patent:

UNITED STATES PATENTS

| Number | Name | Date |
|---|---|---|
| 1,063,971 | Hilscher | June 10, 1913 |
| 1,875,023 | Krueger | Aug. 30, 1932 |
| 1,946,474 | Banks et al. | Feb. 13, 1934 |
| 1,999,881 | Lowe | Apr. 30, 1935 |
| 2,090,069 | Richardson et al. | Aug. 17, 1937 |
| 2,211,753 | Leopold | Aug. 20, 1940 |